(12) United States Patent
Szu et al.

(10) Patent No.: US 9,945,457 B2
(45) Date of Patent: Apr. 17, 2018

(54) LINEAR ROTARY MECHANISM

(71) Applicant: HIWIN MIKROSYSTEM CORP., Taichung (TW)

(72) Inventors: Kou-I Szu, Taichung (TW); Yu-Jung Chang, Taichung (TW); Chih-Kai Fan, Taichung (TW); Ying-Jung Chen, Taichung (TW)

(73) Assignee: HIWIN MIKROSYSTEM CORP., Taichung (TW)

( * ) Notice: Subject to any disclaimer, the term of this patent is extended or adjusted under 35 U.S.C. 154(b) by 295 days.

(21) Appl. No.: 14/794,500

(22) Filed: Jul. 8, 2015

(65) Prior Publication Data

US 2017/0009855 A1 Jan. 12, 2017

(51) Int. Cl.
*H02K 41/00* (2006.01)
*F16H 19/02* (2006.01)
*H02K 7/116* (2006.01)
*H02K 41/02* (2006.01)
*H02K 7/00* (2006.01)
*H02K 41/03* (2006.01)

(52) U.S. Cl.
CPC ............ *F16H 19/025* (2013.01); *H02K 7/00* (2013.01); *H02K 7/116* (2013.01); *H02K 41/02* (2013.01); *H02K 41/031* (2013.01)

(58) Field of Classification Search
CPC ...... H02K 16/00; H02K 41/02; H02K 41/031; H02K 7/00; H02K 7/116; H02K 21/14; H02K 7/06; H02K 7/10
See application file for complete search history.

(56) References Cited

U.S. PATENT DOCUMENTS

| | | | | |
|---|---|---|---|---|
| 6,433,447 | B1 * | 8/2002 | Kitazawa | H02K 7/20 310/12.14 |
| 7,091,679 | B2 * | 8/2006 | Schroeder | H02K 41/031 310/12.24 |
| 8,686,603 | B2 * | 4/2014 | Aso | H02K 7/083 310/12.14 |
| 2014/0139050 | A1 * | 5/2014 | Rohner | H02K 41/031 310/12.14 |

* cited by examiner

*Primary Examiner* — Joshua Benitez-Rosario
*Assistant Examiner* — Leda Pham
(74) *Attorney, Agent, or Firm* — GUICE PATENTS PLLC (57) ABSTRACT

A linear rotary mechanism includes: a pair of elongated guide rails in parallel to each other: a linear motor having a tubular primary side slidably disposed on the guide rails and a shaft-shaped secondary side coaxially extending into an internal hole of the tubular primary side, the shaft-shaped secondary side being axially linearly reciprocally movable along the tubular primary side; and a rotary motor fixedly disposed on the guide rails and connected with one end of the shaft-shaped secondary side. Accordingly, the rotary motor is linearly reciprocally movable along the tubular primary side in synchronism with the shaft-shaped secondary side and the guide rails.

5 Claims, 9 Drawing Sheets

LINEAR ROTARY MECHANISM

BACKGROUND OF THE INVENTION

1. Field of the Invention

The present invention relates generally to a motor, and more particularly to a linear rotary mechanism.

2. Description of the Related Art

Figure 1:
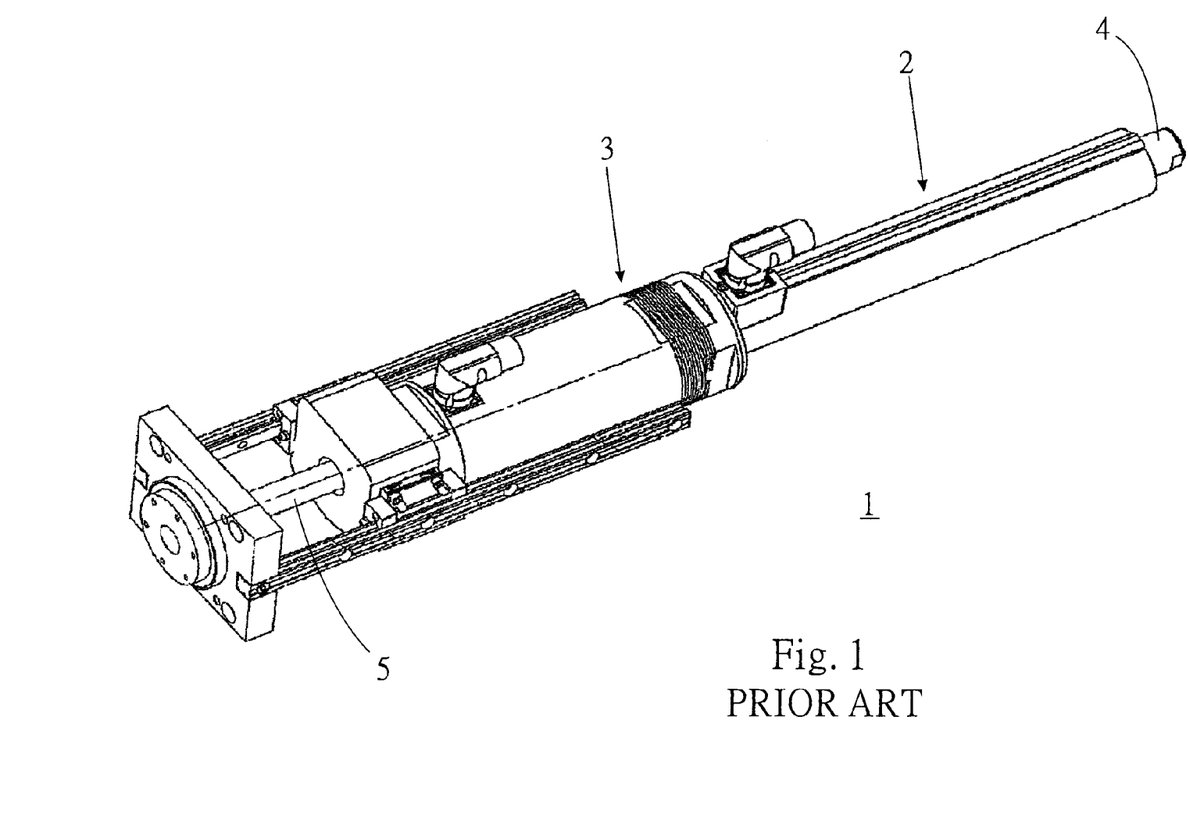
FIG. 1 is a perspective view of a conventional rotary lifting device.
Figure 2:
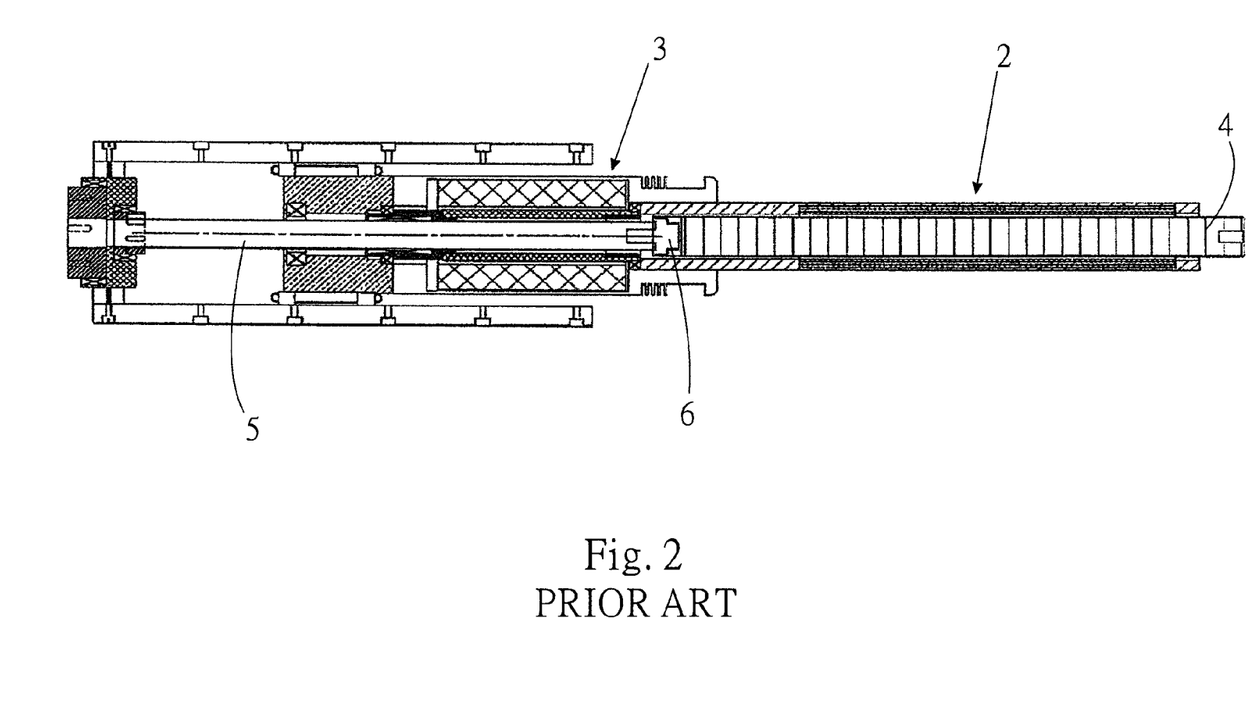
FIG. 2 is a sectional view of the conventional rotary lifting device.

FIGS. 1 and 2 show a conventional rotary lifting device 1. The rotary lifting device 1 includes a linear motor 2 and a rotary motor 3 coaxially coupled with each other. The shaft-shaped secondary side 4 of the linear motor 2 is coaxially coupled with the actuator shaft 5 of the rotary motor 3 by a coupling 6. Accordingly, the actuator shaft 5 and the secondary side 4 can synchronously operate and the rotary motor 3 can drive the actuator shaft 5 and the secondary side 4 to rotate and the linear motor 2 can drive the actuator shaft 5 and the secondary side 4 to linearly reciprocally move. Therefore, when the rotary lifting device 1 provides a linear reciprocation power, the rotary lifting device 1 also provides a rotational power to meet the requirements of industries for automation.

In order to prevent the secondary side 4 from axially moving to the range of the primary side of the rotary motor 3 or prevent the actuator shaft 5 from displacing to the range of the primary side of the linear motor, the rotary motor 3 and the linear motor 2 of the rotary lifting device 1 must be spaced from each other by a certain distance as the travel of the axial displacement of the secondary side 4 and the actuator shaft 5. In other words, the longer the necessary travel is, the longer the length of the tubular spacer section 7 positioned between the rotary motor 3 and the linear motor 2 is. As a result, the total length of the rotary lifting device 1 is greatly increased.

Moreover, the rotary motor 3 of the rotary lifting device 1 via the actuator shaft 5 drives the secondary side 4 to synchronously rotate and the length of the actuator shaft 5 is in direct proportion to the output torque of the rotary motor 3. Therefore, in the case that a larger travel is needed, the output torque of the rotary motor 3 must be correspondingly greatly increased so as to provide the necessary rotational power.

SUMMARY OF THE INVENTION

It is therefore a primary object of the present invention to provide a linear rotary mechanism includes a rotary motor and a linear motor. The rotary motor provides rotational power for the shaft-shaped secondary side of the linear motor. The rotary motor is fixedly connected with one end of the shaft-shaped secondary side of the linear motor, whereby the rotary motor is linearly reciprocally movable along the primary side of the linear motor in synchronism with the shaft-shaped secondary side. In comparison with the conventional device in which the rotary motor is drivingly connected with the linear motor, the linear rotary mechanism greatly shortens the length of the output shaft of the rotary motor. Also, even if the travel is increased, it is unnecessary to increase the length of the output shaft of the rotary motor. Therefore, the total volume of the linear rotary mechanism will not be excessively increased and the necessary output torque of the rotary motor can be reduced.

To achieve the above and other objects, the linear rotary mechanism of the present invention includes: a pair of elongated guide rails in parallel to each other: a linear motor having a tubular primary side slidably disposed on the guide rails and a shaft-shaped secondary side coaxially extending into an internal hole of the tubular primary side, the shaft-shaped secondary side being axially linearly reciprocally movable along the tubular primary side; and a rotary motor fixedly disposed on the guide rails and connected with one end of the shaft-shaped secondary side. Accordingly, the rotary motor is linearly reciprocally movable along the tubular primary side in synchronism with the shaft-shaped secondary side and the guide rails.

In the above linear rotary mechanism, in order to more stabilize the operation of the linear rotary mechanism, the linear motor further includes an end piece pivotally disposed at the other end of the shaft-shaped secondary side and fixedly bridged between the guide rails. Accordingly, two ends of the shaft-shaped secondary side can be respectively properly supported.

In the above linear rotary mechanism, in order to facilitate connection between the shaft-shaped secondary side and the rotary motor, the linear motor further includes a connection ring coaxially disposed at the other end of the shaft-shaped secondary side. The linear motor is connected with the rotary motor via the connection ring.

In the above linear rotary mechanism, in order to make the rotary motor drives the shaft-shaped secondary side to rotate, the other end of the shaft-shaped secondary side is coaxially connected with the rotor of the rotary motor, whereby the rotor and the shaft-shaped secondary side can synchronously rotate.

Alternatively, the rotational power output from the rotor of the rotary motor can be applied to an external component instead of the shaft-shaped secondary side in accordance with different practical application requirements of industries. In this case, one end of the shaft-shaped secondary side is fixedly connected to outer side of the stator of the rotary motor.

Moreover, in order to conveniently change the object to which the rotational power of the rotary motor is applied, the linear rotary mechanism further includes a connection section bridged between the rotary motor and the guide rails for easily changing the direction of the rotary motor.

In the above linear rotary mechanism, the connection section has two side blocks respectively disposed on two sides of the rotary motor and fixedly connected with the adjacent guide rails.

In the above linear rotary mechanism, the connection section further includes two rotary shafts coaxially oppositely disposed between two sides of the rotary motor and the adjacent side blocks, whereby the rotary motor can be rotated around the rotary shafts between the side blocks so as to change the direction.

The present invention can be best understood through the following description and accompanying drawings, wherein:

DETAILED DESCRIPTION OF THE PREFERRED EMBODIMENTS

Figure 3:
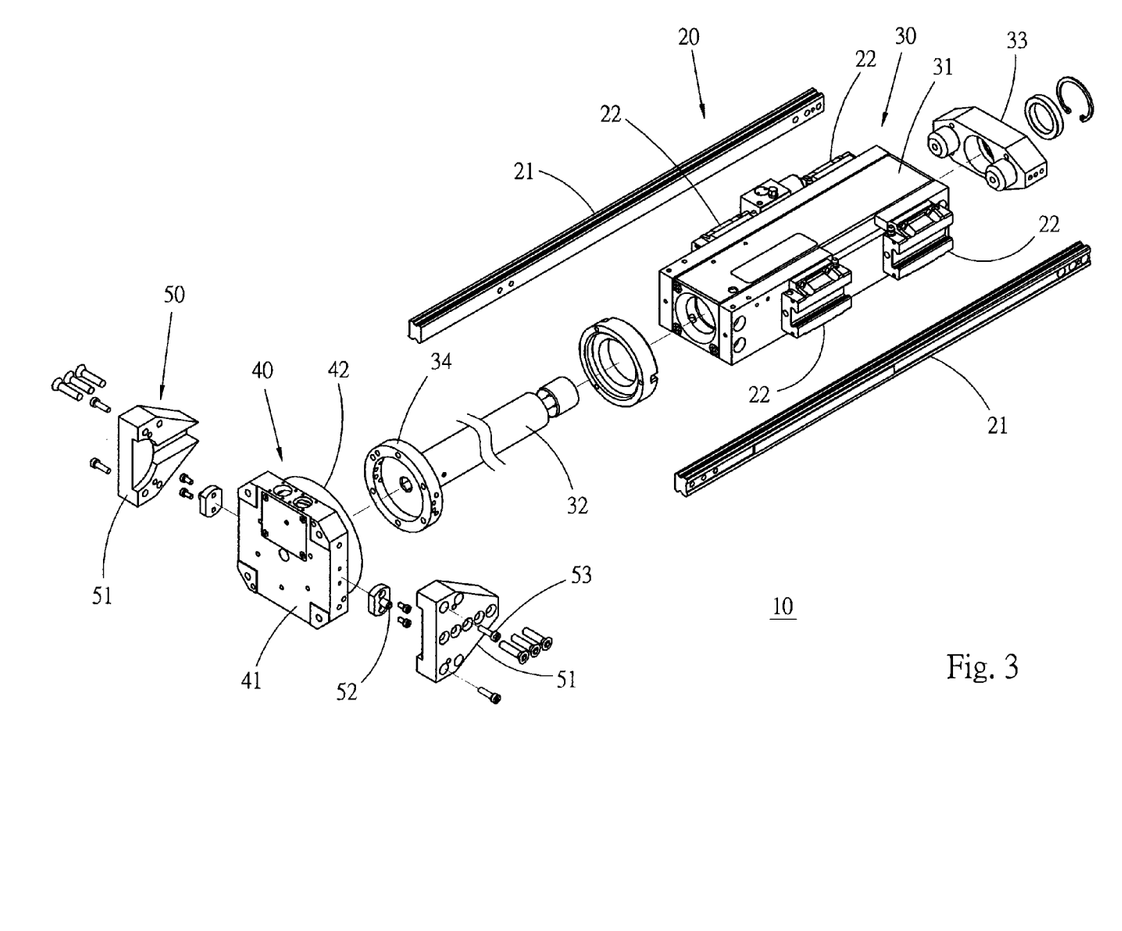
FIG. 3 is a perspective exploded view of a preferred embodiment of the present invention.
Figure 4:
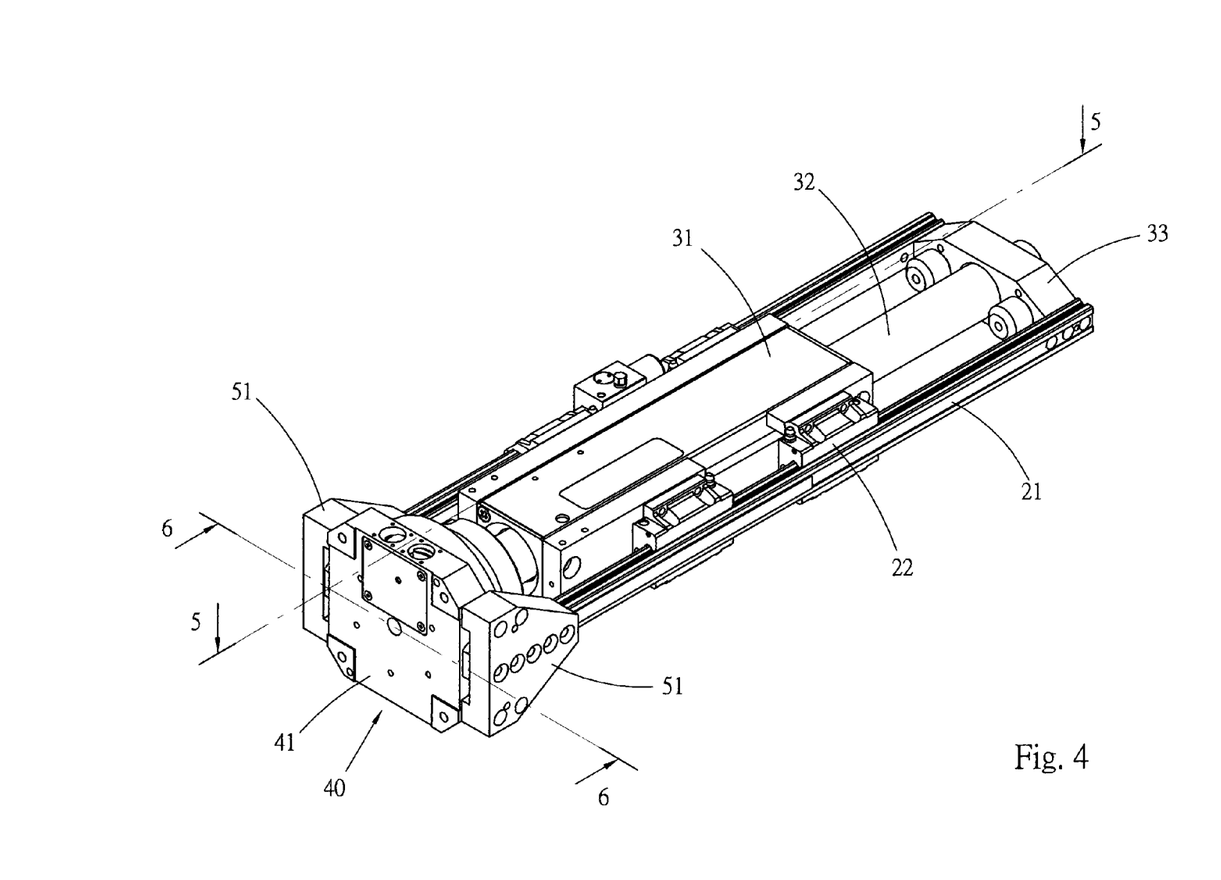
FIG. 4 is a perspective assembled view of the present invention, showing an application embodiment thereof.

Please first refer to FIGS. 3 and 4. According to a preferred embodiment, the linear rotary mechanism 10 of the present invention includes a guide section 20, a linear motor 30, a rotary motor 40 and a coupling section 50.

The guide section 20 has a pair of elongated straight guide rails 21 in parallel to each other and multiple slide blocks 22 slidably disposed on the guide rails 21. The slide blocks 22 can linearly reciprocally move in the lengthwise direction of the guide rails 21.

The linear motor 30 has a tubular primary side 31 with a rectangular outer configuration and a circular inner configuration. The primary side 31 is positioned between the guide rails 21 with its axis parallel to the lengthwise direction of the guide rails 21. The primary side 31 is directly or indirectly connected with the slide blocks 22, whereby the tubular primary side 31 is slidably disposed between the guide rails 21 via the slide blocks 22. The linear motor 30 further has a shaft-shaped secondary side 32 coaxially extending into the internal hole of the tubular primary side 31. The secondary side 32 can linearly reciprocally move in its axial direction along the tubular primary side 31. An end piece 33 with a certain configuration is fixedly bridged between first ends of the guide rails 21 and pivotally connected with first end of the shaft-shaped secondary side 32. Accordingly, the shaft-shaped secondary side 32 is supported by the end piece 33 to self-rotate. A connection ring 34 is coaxially disposed at second end of the shaft-shaped secondary side 32 to radially protrude therefrom. In the case that the tubular primary side 31 is indirectly connected with the slide blocks 22, certain radiating fins or a cooling module can be sandwiched between the slide blocks 22 and the tubular primary side 31 so as to dissipate the heat generated by the tubular primary side 31 in operation and lower the temperature thereof.

The rotary motor 40 is fixedly bridged between second ends of the guide rails 21 and fixedly connected with the second end of the shaft-shaped secondary side 32 via the connection ring 34. Accordingly, the rotary motor 40 can linearly reciprocally move along the tubular primary side 31 in synchronism with the shaft-shaped secondary side 32 and the guide rails 21.

The rotary motor 40 is directly fixedly connected on the shaft-shaped secondary side 32 and is axially linearly reciprocally movable along the tubular primary side 31 in synchronism with the shaft-shaped secondary side 32. Therefore, it is unnecessary to additionally increase the length of the actuator shaft of the rotary motor as in the conventional device. The relative axial displacement structures of the actuator shaft and the rotary motor permits the power to be transmitted in such a manner that when the rotary motor 40 of the linear rotary mechanism 10 drives the shaft-shaped secondary side 32 to rotate, the torque applied to the shaft-shaped secondary side 32 is directly outward transmitted from the shaft-shaped secondary side 32. Therefore, it is no more necessary to additionally bear the rotational load of the longer actuator shaft of the rotary motor as in the conventional device. Accordingly, the total length and volume of the linear rotary mechanism 10 can be greatly reduced. Even if it is necessary to increase the travel, the linear rotary mechanism 10 is free from the shortcoming of the conventional device that the length must be excessively increased. This is beneficial to simplification of components and automation of industries.

Figure 5:
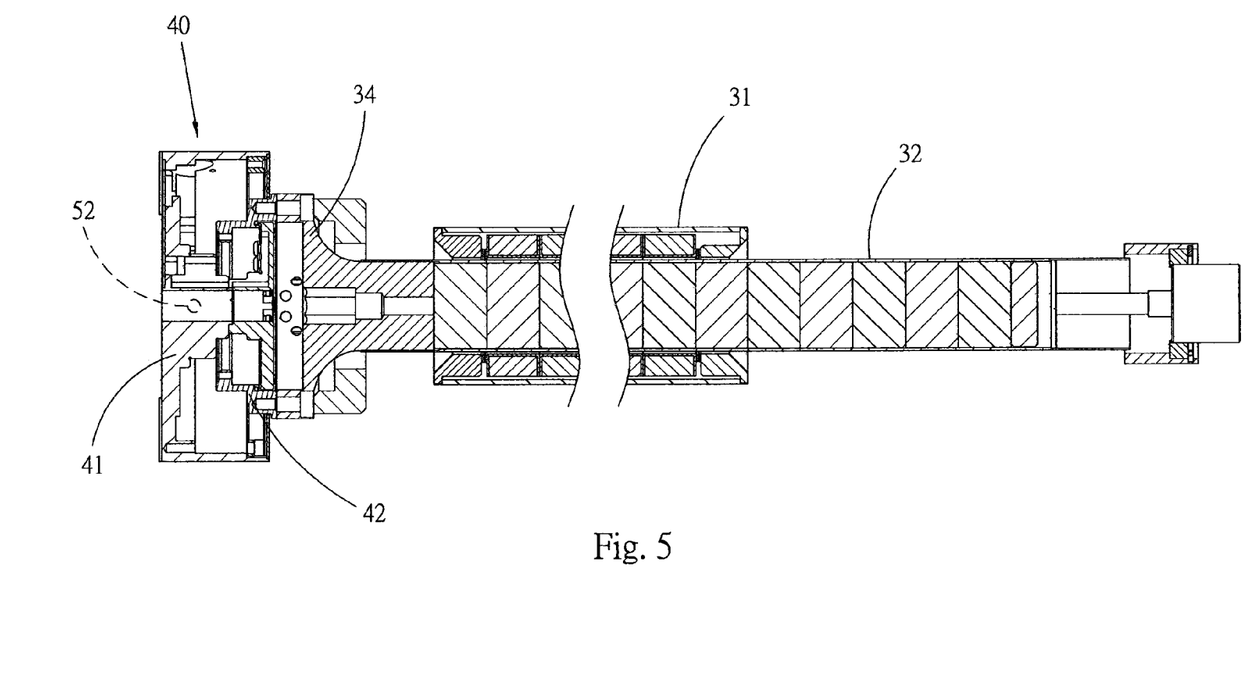
FIG. 5 is a sectional taken along line 5-5 of FIG. 4.
Figure 6:
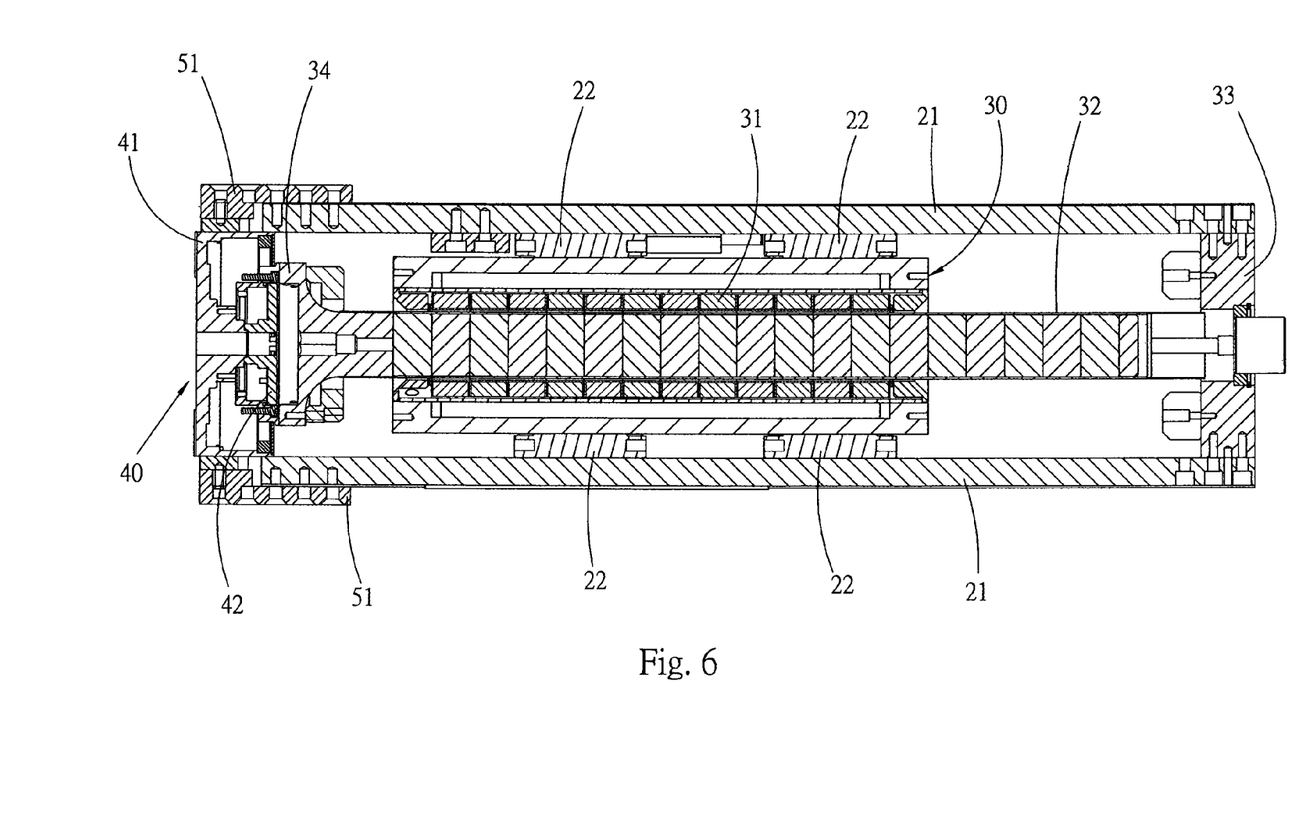
FIG. 6 is a sectional taken along line 6-6 of FIG. 4.
Figure 7:
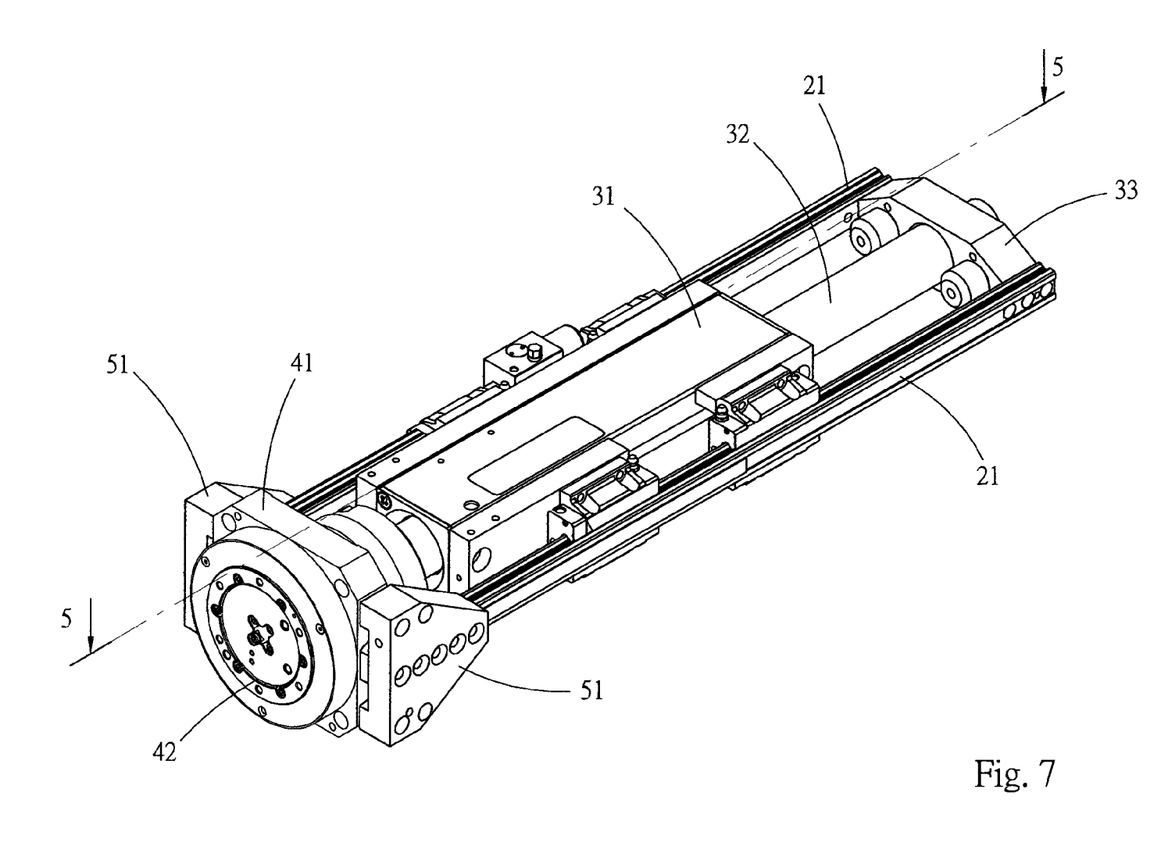
FIG. 7 is a perspective assembled view of the present invention, showing another application embodiment thereof.

Moreover, in addition to the above effect of reduction of total volume, the manner in which the linear rotary mechanism 10 applies action force to external component can be changed in accordance with practical requirements of industries. FIGS. 4 to 6 show an application embodiment of the linear rotary mechanism 10. In this embodiment, the shaft-shaped secondary side 32 of the linear rotary mechanism 10 can linearly reciprocally move and self-rotate at the same time. FIG. 7 shows another application embodiment in which the shaft-shaped secondary side 32 of the linear rotary mechanism 10 can only linearly reciprocally move, while the rotary motor 40 exerts rotational action force to other transmission components.

To speak more specifically, according to the embodiment as shown in FIGS. 4 to 6, the rotary motor 40 further includes a stator section 41 fixedly bridged between the guide rails 21 and a rotor section 42 directed to the linear motor 30 to serve as an output end. The output end is fixedly coaxially connected with the connection ring 34, whereby the rotor section 42 can drive the shaft-shaped secondary side 32 to synchronously rotate. Also, by means of the connection of the connection ring 34, the rotor section 42 is synchronously linearly reciprocally movable with the shaft-shaped secondary side 32.

Figure 8:
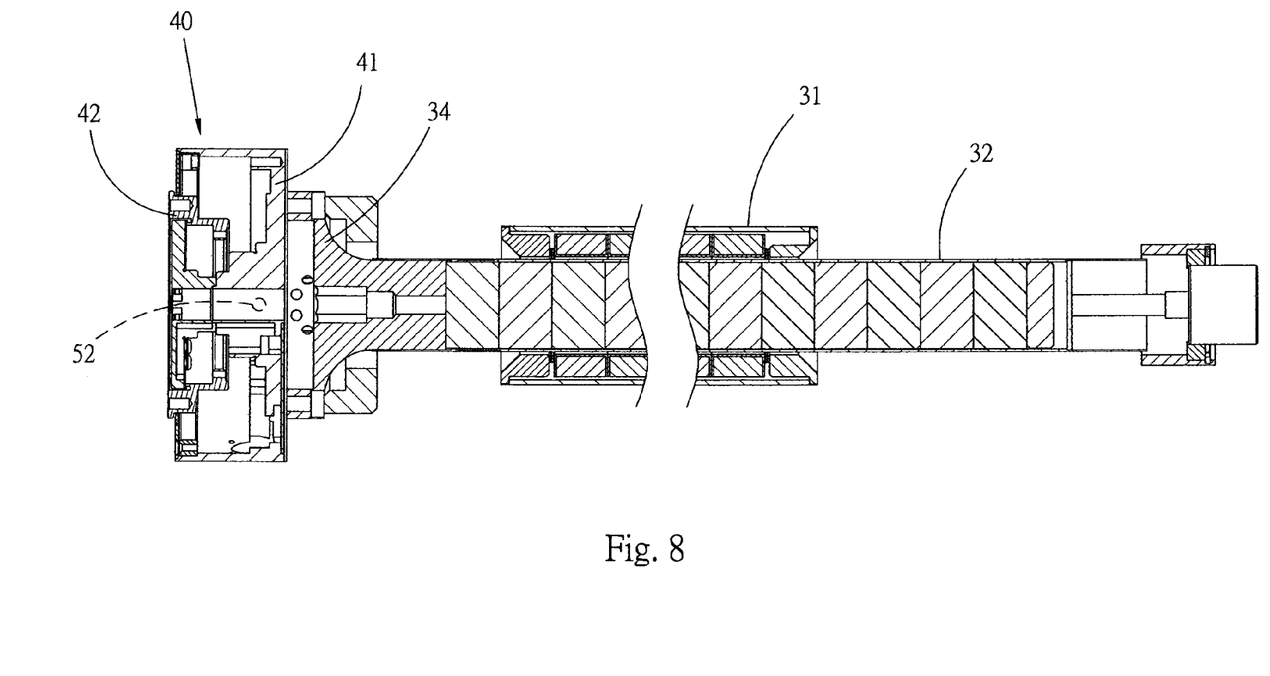
FIG. 8 is a sectional taken along line 8-8 of FIG. 7.

Please further refer to FIGS. 7 and 8. In the other application embodiment, the stator section 41 of the rotary motor 40 is fixedly bridged between the guide rails 21. This embodiment is different from the above embodiment in that the output end formed of the rotor section 42 is opposite to the linear motor 30. Instead, the case of the stator section 41 is fixedly connected with the connection ring 34. In this case, the rotary motor 40 is synchronously linearly reciprocally movable with the shaft-shaped secondary side 32 and the rotor section 42 opposite to the shaft-shaped secondary side 32 exerts rotational action force to an external component on the back of the shaft-shaped secondary side 32.

Figure 9:
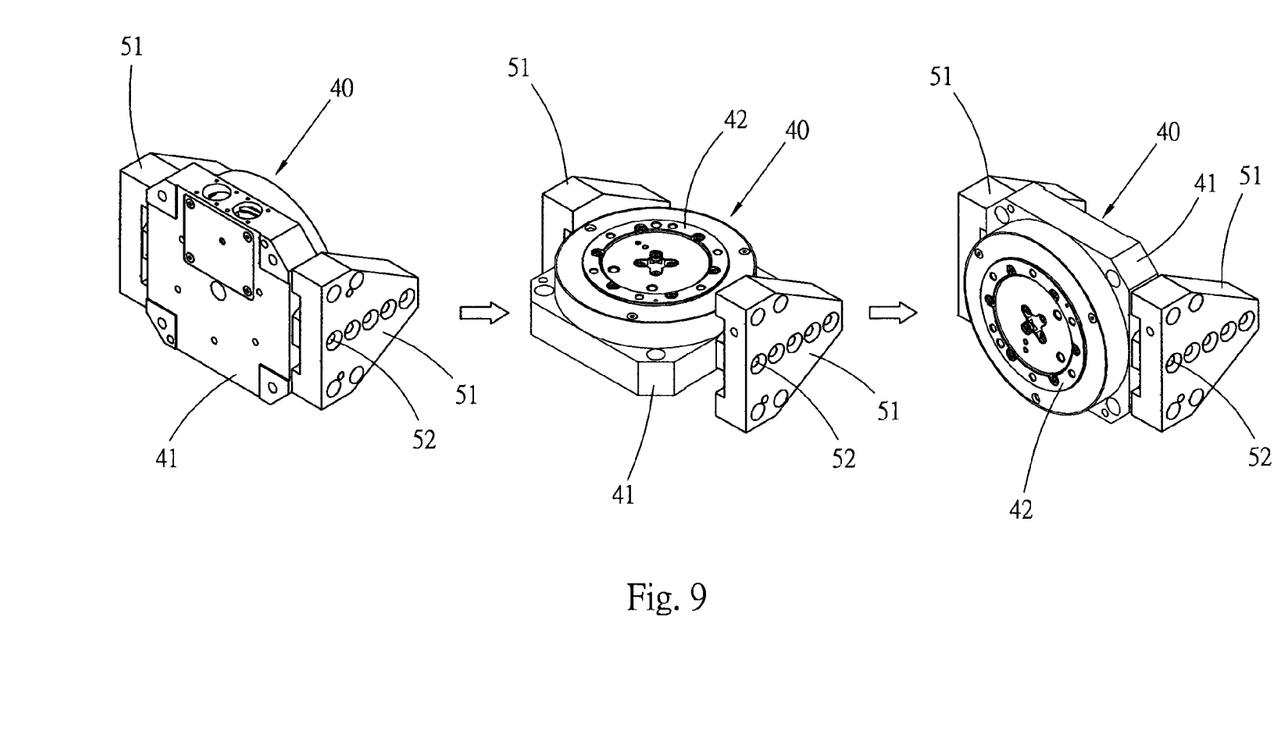
FIG. 9 is a perspective view of a preferred embodiment of the present invention, showing the operation of a part of the present invention.

Furthermore, in order to facilitate connection between the rotary motor 40 and the guide rails 21 and change of the relative state between the rotary motor 40 and the linear motor 30, the connection section 50 is provided to achieve this effect. Please refer to FIG. 9. The connection section 50 has two side blocks 51 with a certain configuration. The two side blocks 51 are respectively fixedly disposed on the guide rails 21 to hold two sides of the case of the stator section 41. Two rotary shafts 52 are coaxially oppositely disposed between two sides of the case of the stator section 41 and the two side blocks 51. The axial direction of the rotary shafts 52 is normal to the lengthwise direction of the guide rails 21. Accordingly, the rotary motor 40 can be rotated around the rotary shafts 52 between the guide rails 21 so as to change the corresponding state between the output end of the rotor section 42 and the linear motor 30. Multiple fixing bolts 53 are respectively fixedly connected between the side blocks 51 and the case of the stator section 41 so as to fix and locate the rotary motor 40 between the side blocks 51.

The above embodiments are only used to illustrate the present invention, not intended to limit the scope thereof. Many modifications of the above embodiments can be made without departing from the spirit of the present invention.

What is claimed is:

1. A linear rotary mechanism comprising:
a pair of elongated guide rails in parallel to each other;
a linear motor having a tubular primary side slidably disposed on the guide rails and a shaft-shaped secondary side coaxially extending into an internal hole of the tubular primary side, the shaft-shaped secondary side being axially linearly reciprocally movable along the tubular primary side;
a rotary motor fixedly disposed on the guide rails and connected with one end of the shaft-shaped secondary side, the rotary motor being linearly reciprocally movable along the tubular primary side in synchronism with the shaft-shaped secondary side and the guide rails; and
a connection section bridged between the rotary motor and the guide rails;
wherein the connection section has two side blocks respectively disposed on two sides of the rotary motor and fixedly connected with the adjacent guide rails;
wherein the connection section further includes two rotary shafts coaxially oppositely disposed between two sides of the rotary motor and the adjacent side blocks, whereby the rotary motor can be rotated around the rotary shafts between the side blocks so as to change the direction.

2. The linear rotary mechanism as claimed in claim 1, wherein the linear motor further includes an end piece pivotally disposed at the other end of the shaft-shaped secondary side and fixedly bridged between the guide rails.

3. The linear rotary mechanism as claimed in claim 1, wherein the linear motor further includes a connection ring coaxially disposed at the other end of the shaft-shaped secondary side, the linear motor being connected with the rotary motor via the connection ring.

4. The linear rotary mechanism as claimed in claim 1, wherein the rotary motor further includes a rotor section connected with the other end of the shaft-shaped secondary side, whereby the rotor section and the shaft-shaped secondary side can synchronously rotate.

5. The linear rotary mechanism as claimed in claim 1, wherein the rotary motor further includes a stator section connected with the other end of the shaft-shaped secondary side, whereby the rotary motor is synchronously linearly reciprocally movable with the shaft-shaped secondary side.

* * * * *